United States Patent [19]
Salisbury et al.

[11] Patent Number: 5,672,443
[45] Date of Patent: Sep. 30, 1997

[54] BATTERY SEALING CAP

[75] Inventors: Timothy L. Salisbury, Phillips; Charles A. Draheim, Platteville; Joseph L. Passaniti, Fitchburg, all of Wis.

[73] Assignees: Phillips Plastics Corporation, Prescott; Rayovac Corporation, Madison, both of Wis.

[21] Appl. No.: 407,391

[22] Filed: Mar. 20, 1995

Related U.S. Application Data

[63] Continuation-in-part of Ser. No. 228,309, Apr. 15, 1994, abandoned.

[51] Int. Cl.$^6$ .................................................. H01M 2/08
[52] U.S. Cl. .......................... 429/185; 429/163; 429/165; 429/181; 429/171
[58] Field of Search .................................. 429/161, 163, 429/165, 181, 174, 171, 184, 185, 164, 172

[56] References Cited

U.S. PATENT DOCUMENTS

| | | | |
|---|---|---|---|
| 3,042,734 | 7/1962 | Carmichael et al. | 136/133 |
| 3,617,386 | 11/1971 | Bosben et al. | 136/107 |
| 3,663,301 | 5/1972 | Ralston et al. | 136/107 |
| 3,764,392 | 10/1973 | Kuwazaki et al. | 136/107 |
| 3,954,505 | 5/1976 | Anderson | 136/110 |
| 4,075,398 | 2/1978 | Levy | 429/56 |
| 4,122,242 | 10/1978 | Feldhake | 429/174 |
| 4,191,806 | 3/1980 | Levy | 429/56 |
| 4,220,695 | 9/1980 | Ishida et al. | 429/172 |
| 4,282,293 | 8/1981 | van Lier | 429/174 |
| 4,476,200 | 10/1984 | Markin et al. | 429/174 |
| 4,670,362 | 6/1987 | Wiacek et al. | 429/163 |

FOREIGN PATENT DOCUMENTS

| | | |
|---|---|---|
| 0 037 121 | 3/1981 | European Pat. Off. . |
| 0 081 201 | 12/1982 | European Pat. Off. . |

OTHER PUBLICATIONS

Webster's II New Riverside University Dictionary, Riverside Publishing Co, 1988 p. 390 (no month available).

*Primary Examiner*—Prince Willis, Jr.
*Assistant Examiner*—Carol Chaney
*Attorney, Agent, or Firm*—Merchant, Gould, Smith, Edell, Welter & Schmidt, P.A.

[57] ABSTRACT

A battery sealing cap having a base with a top surface and a bottom surface, an annular rim attached to and extending outward from the top surface of the base, and a central portion having a first end and a second end attached to and generally located on the base such that the first end extends outward from the top surface and the second end extends outward from the bottom surface. The battery sealing cap also includes a centrally located channel with a longitudinal axis extending from the first end to a closed bottom portion at the second end, the closed bottom portion having a tab extending into the channel which is out of alignment with the longitudinal axis of the channel.

14 Claims, 3 Drawing Sheets

BATTERY SEALING CAP

This is a Continuation-In-Part of application Ser. No. 08/228,309, filed Apr. 15, 1994, abandoned Apr. 14, 1995.

TECHNICAL FIELD OF THE INVENTION

The present invention relates to batteries and more particularly, to a sealing cap which is used to seal the battery cell during cell manufacture.

BACKGROUND ART

Battery cells utilize a sealing cap to isolate anode and cathode mixtures within the battery cell from each other. The sealing cap is inserted and crimped into position to complete the assembly of the cell. As shown in FIG. 1, prior art batteries 10 contain an anode mixture 12 and a cathode mixture 11 separated by an inner separator strip 14 and an outer separator strip 15 and encased within a closed end container or can 16 which forms the positive terminal. A bottom cup 18 is also placed between the outer separator strip 14 and the positive can 16.

A sealing cap 20 is then positioned above the anode mixture 12 and the cathode mixture 11 such that it is in contact with the inner separator strip 14 and the positive can 16 to seal the anode mixture 12 and cathode mixture 11 within the battery 10 and from each other. The can 16 is then crimped around the sealing cap 20 to ensure a tight seal. The battery 10 also contains a negative current collector 13 which is inserted through the sealing cap 20 and an absorbent washer 19 and negative contact spring 17 positioned over the top of the negative current collector 13 and sealing cap 20.

During assembly, great care is taken to ensure that a tight seal is achieved between the sealing cap 20, negative current collector 13, inner separator strip 14 and positive can 16. To create a tight seal between the negative current collector 13 and the sealing cap 20, the negative current collector 13 is forced downward through a channel in the sealing cap 20 that has a closed bottom portion. The negative current collector 13 then breaks through the closed bottom portion such that a tight seal is formed between the negative current collector 13 and the sealing cap 20.

Unfortunately when the negative current collector is forced through the closed bottom portion of the channel, the material from the closed bottom portion has a tendency to shred and become loose, which can interfere with battery production in automated assembly equipment.

Therefore, there arises a need for a battery sealing cap which will not shed particles or debris during the insertion of the negative current collector and which has a low profile in relation to the bottom surface of the sealing cap so that it can be used with current battery assembly machinery.

SUMMARY OF THE INVENTION

The present invention is a battery sealing cap having a generally disk-shaped base member with a top surface and a bottom surface. An annular rim is attached to and extends outward from the top surface of the base forming an outer radial portion of the sealing cap. This outer rim is formed to engage an seal against the positive current collector of the electrochemical cell. In general the positive current collector will be the surface of a closed end container or can having upstanding walls. A central hub portion having a first end and a second end is attached to and generally centrally located on the base so that the first end extends outward from the top surface and the second end extends outward from the bottom surface. The central portion also has a centrally located channel or aperture with a central or longitudinal axis extending from the first end to a closed bottom portion at the second end. The closed bottom portion of the channel has a tab extending into the channel which is asymmetric and therefore out of alignment with the longitudinal axis of the channel.

The present invention meets the need for a battery sealing cap that will seal the anode and cathode mixtures within a battery and from each other and that will not result in the creation of loose particles during the insertion of the negative current collector through the use of a tab that extends into the channel which is out of alignment with the longitudinal axis of the channel. As the negative current collector is inserted into the channel, preferably with the aid of a beveled opening, the preferably flat distal end of the negative current collector makes contact with the tab and does not contact the entire surface of the closed bottom portion. Therefore, the force exerted by the negative current collector causes the closed bottom portion to break beneath the tab first and then to tear toward the remainder of the closed bottom portion until the negative current collector emerges through the bottom surface. This tab arrangement results in the closed bottom portion being attached to the second end of the central hub portion so that no loose particles are created.

The present invention also meets the need for a battery sealing cap which has a low profile in relation to its bottom surface because the tab provides a reliable means for breaking through the closed bottom portion without the possibility of sheading occurring. Therefore, the need for a closed bottom portion with a large extension is eliminated.

The present invention is further explained hereinafter with more particularity and by reference to the preferred embodiment shown in the following drawings.

BRIEF DESCRIPTION OF THE DRAWINGS

In the drawings, wherein like reference letters and numerals indicate corresponding elements throughout the several views.

DESCRIPTION OF THE PREFERRED EMBODIMENT

Figure 1:
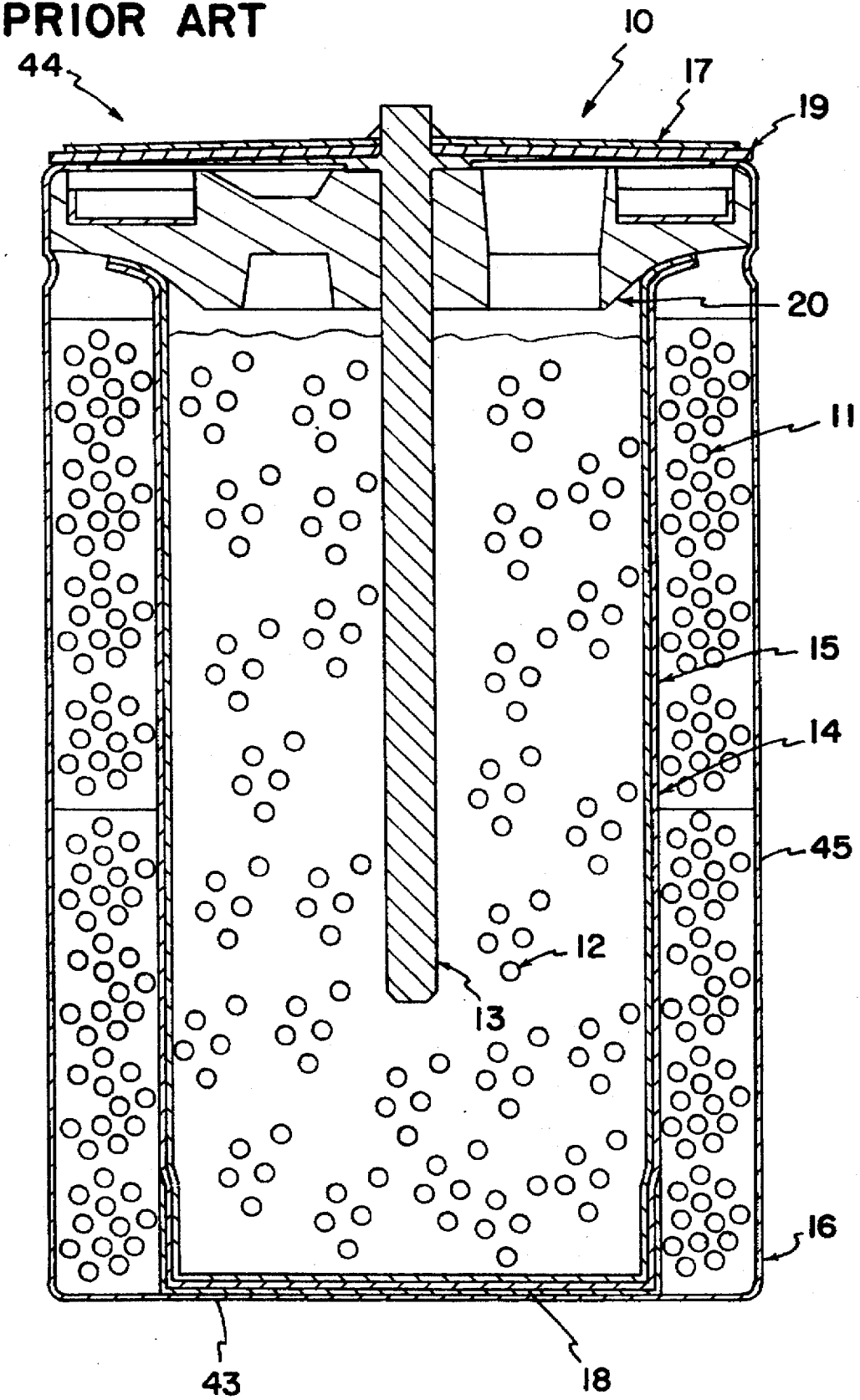
FIG. 1 is a cross-sectional view of a prior art version of a battery having a sealing cap.
Figure 2:
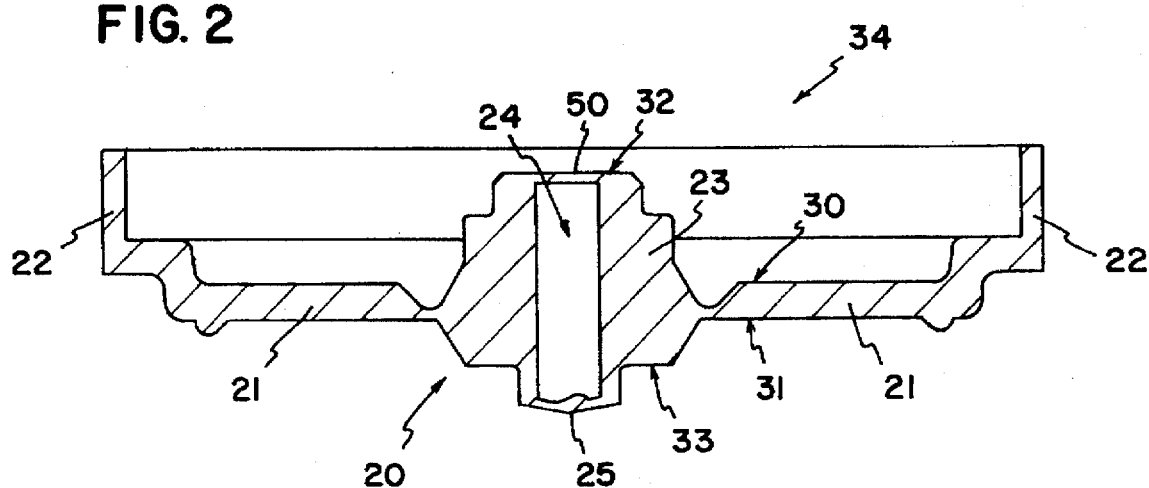
FIG. 2 is a cross-sectional view of the preferred embodiment of a sealing cap for use with a battery.

The preferred embodiment of battery sealing cap 34 is shown in FIG. 2. This battery cap replaces the prior art battery cap 20 shown in FIG. 1. In general the preferred battery cap 34 is used in place of the prior art battery cap 20 in the alkaline cell battery construction illustrated in connection with FIG. 1. The preferred material for the battery cap is Nylon 6—6. It is preferred to manufacture the part in a multiple cavity mold by injection molding. Nylon is preferred for alkaline manganese dioxide cells because of its chemical and mechanical properties. Other materials and processing techniques may be suitable as well. For example, polypropylene and polyamide plastic may prove useful for certain battery chemistries and designs. It should be appreciated that batteries conform to certain size standards, and it should be understood that the sealing cap is specifically useful for A, AA, AAA, C, D sizes among other sizes.

The electrochemical cell will typically include a can or container having upstanding sidewalls 45 and a closed end 43 and an open end 44. During assembly the sealing cap occludes the open end 44 and is crimped into position to from the completed cell.

As shown in FIG. 2, the preferred embodiment of the sealing cap 34 contains a base portion 21, an annular rim 22 and a central hub portion 23. The base 21 is shaped and sized so that the base 21 will cover and seal a predetermined battery size and shape, such as AA or C or D sized cells. The annular rim 22 extends outward from the top surface 30 of the base 21 and extends around the entire circumference of the base 21. The central hub portion 23 is generally centrally located and attached to the base 21 and has a first end 32 and a second end 33, the first end 32 extending outward from the top surface 30 of the base 21 and the second end 33 extending outward from the bottom surface 31 of the base 21. The central hub portion 23 also contains a generally centrally located aperture 24 with a longitudinal axis 36 extending from the first end 32 of the central portion 23 to a closed bottom portion 25, preferably extending less than 0.05 inches from the second end 33.

Figure 3:
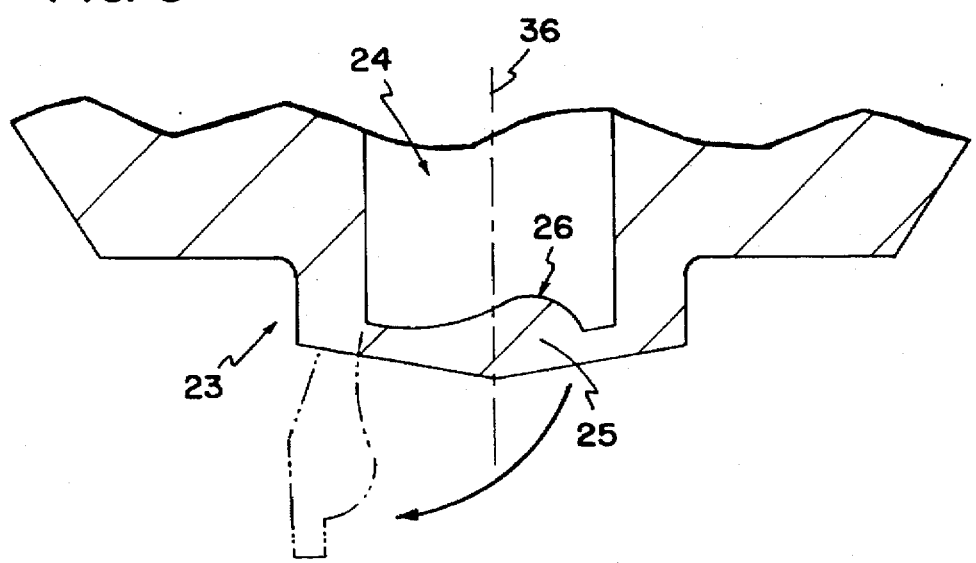
FIG. 3 is a cross-sectional view of the central portion of the preferred embodiment of the invention with portions broken away.

As best seen in FIG. 3, closed bottom portion 25 also includes a tab 26 extending into aperture 24 which is positioned such that tab 26 is out of alignment with the longitudinal axis 36 of aperture 24. When the negative current collector 13 is forced through aperture 24 as described in the background art section herein, the distal end 42 of negative current collector 13 will engage tab 26, which first creates a force on closed bottom portion 25 at tab 26. The downward force of negative current collector 13 then causes the closed bottom portion 25 to break near tab 26 and then tear and rotate downward as shown in FIG. 3. Because closed bottom portion 25 breaks near tab 26 and rotates downward, closed bottom portion 25 remains partially attached to central portion 23. Therefore, the preferred embodiment of the invention will not result in loose fragments in a battery when the negative current collector 13 is forced through the channel 24 since the tab and bottom portion 25 adheres to the hub.

The base 21, annular rim 22, central portion 23, channel 24, and bottom portion 25 would also preferably be made as an integral part by hot runner injection molding an appropriate plastic. Those skilled in the art would recognize that other materials could be used with the present invention. Those skilled in the art would also recognize that the shapes of annular rim 22, base 21, central portion 23 and channel 24 could be formed by machining. However, injection molding is preferred because of its low cost and reliability.

Consequently, the battery sealing cap 34 is seen to include a base 21, having a top surface 30, and a bottom surface 31, Which connect to a generally centrally disposed central hub portion. The hub portion 23 is located within a so called first aperture, defined by the inner periphery of the base portion 21. This portion of the battery sealing cap 34 is specifically sized and shaped to cover a predetermined size and shape of battery cell. Preferably, an annular rim 22 is attached to the top surface 30, and extends continuously around the longitudinal or central axis 36. The central hub portion 23 includes both an upper or first end 32, as well as a lower or second end 33. The central hub portion is connected to the base portion 21, at a position intermediate the first end 32, and the second end 33. The central hub portion 23 further includes a centrally located second aperture, or channel 24. This channel 24 may preferably include a beveled opening 50 to assist in guiding a preferably flat distal end 42 on the current collector 13. This second aperture, or channel 24 extends from the first end to a closed bottom portion 25. The closed bottom portion 25 includes a tab 26, which extends into the second aperture, or channel 24, and which is asymmetric, in that it is positioned out of alignment with respect to the centrally disposed central or longitudinal axis 36. Consequently, when the negative current collector 13 abuts the tab 26, the bottom portion is loaded off-axis, as shown by force vector 38 in FIG. 4. This asymmetrical loading causes a preferential fracture of the closed bottom portion adjacent the tab 26, causing it to preferentially adhere to the central hub portion 23, as shown in FIG. 5. In this manner, a hinge portion 40 may be defined as the area adjacent the second aperture, or channel 24 in the tab 26.

Figure 4:
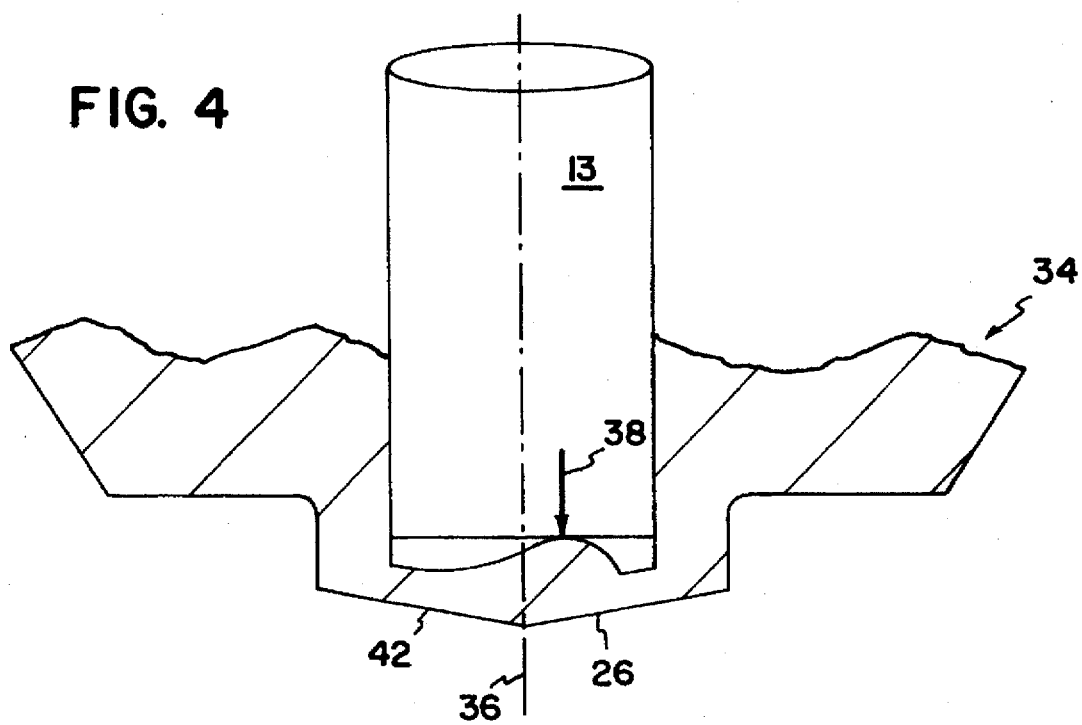
FIG. 4 is a cross-sectional view of the central portion of the preferred embodiment of the invention.
Figure 5:
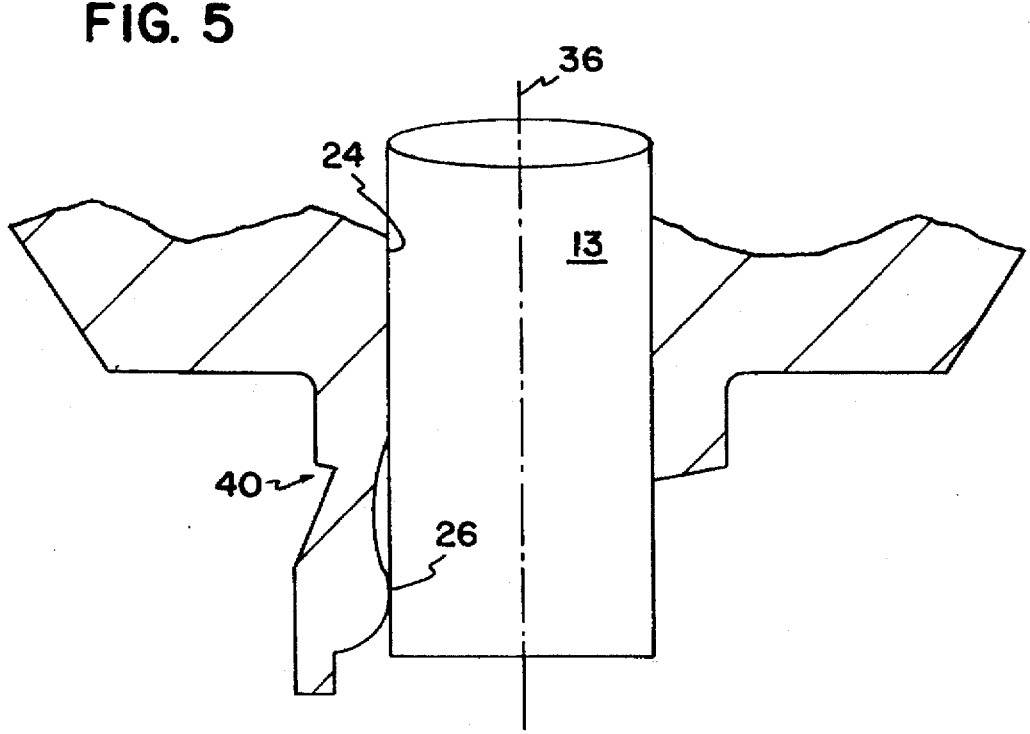
FIG. 5 is a cross-sectional view of the central portion of the preferred embodiment of the invention.

It is preferred to use a current collector 13 of the type having a flat end surface 42, as shown in FIG. 4, to insure that the tab is loaded in an off-set manner, however other end tip configurations may be readily substituted within the scope of the invention. In an embodiment of an electrochemical cell, the electrochemical cell includes a cylindrical metal container, a cylindrical annular cathode, a cylindrical anode, an ionically permeable separator, a centrally disposed negative current collector, and a sealing cap. The cylindrical metal container has an inner surface, a closed first end forming a bottom and an initially open second end, and upstanding sidewalls. The container forms a positive current collector.

The cylindrical annular cathode is disposed within the container and comprises manganese dioxide. The cathode has outer peripheral sidewalls and inner peripheral sidewalls. The inner sidewalls form a central cylindrically shaped void disposed therebetween. The cylindrical anode has an outer peripheral surface and comprises gelled zinc. The anode is disposed within the central cylindrically shaped void.

The ionically permeable separator is interposed between at least a portion of the outer peripheral surface of the anode and the inner peripheral surface of the cathode. The negative current collector electrically connects to the anode.

The sealing cap comprises a base, an annular rim, and a central hub. The base has a top surface, a bottom surface, an outer circumference, and a generally centrally disposed inner first aperture defined by an inner periphery of the base. The base is shaped and sized to cover a predetermined size and shape battery. The annular rim is attached to and extends upwardly from the top surface, and extends around the first outer circumference. The central hub has an upper end, a lower second end, and an outer periphery disposed therebetween. The hub is disposed within the first aperture. The outer periphery is contiguous with and attached to the inner periphery. The hub further has a generally centrally located second aperture disposed therethrough. The second aperture has a centrally disposed longitudinal axis extending from the first end to a closed bottom portion at the second end. The closed bottom portion has a tab extending into the second aperture. The central portion of the tab is positioned out of alignment in respect of the centrally disposed longitudinal axis, wherein the closed bottom portion breaks near the tab and tears and rotates downwardly when a force provided by a negative current collector forced through the second aperture is applied thereto. The bottom portion remains partially attached to the central hub.

The sealing cap may also be sized to fit any cylindrical manganese dioxide cell.

Although characteristics and advantages together with details for structure, materials, function and process steps, have been described in reference to the preferred embodiment herein, it is understood that the disclosure is illustrative. To that degree, various changes made, especially to the matters of shape, size and arrangement, to the full extent extended by the general meaning of the terms in which the appended claims are expressed, are within the principles of the present invention.

What is claimed is:

1. A battery sealing cap comprising:
   (a) a base having a top surface and a bottom surface;
   (b) an annular rim attached to and extending outward from the top surface of the base; and
   (c) a central portion having a first end and second end, the central portion being attached to and generally centrally located on the base such that the first end extends outward from the top surface and the second end extends outward from the bottom surface, and having a centrally located channel with a longitudinal axis extending from the first end to a closed bottom portion at the second end, the closed bottom portion having a tab extending into the channel which is out of alignment with the longitudinal axis of the channel.

2. A battery sealing cap according to claim 1, wherein the base, annular rim and central portion are molded as a single part.

3. A battery sealing cap comprising:
   (a) a base with a top surface, a bottom surface, an outer circumference, and a generally centrally disposed inner first aperture defined by an inner periphery of the base, the base being shaped and sized to cover a battery;
   (b) an annular rim attached to and extending upwardly from the top surface, the rim extending around the first outer circumference; and
   (c) a central hub having an upper first end, a lower second end, and an outer periphery disposed therebetween, the hub being disposed within the first aperture, the outer periphery being contiguous with and attached to the inner periphery, the hub further having a generally centrally located second aperture disposed therethrough, the second aperture having a centrally disposed longitudinal axis extending from the first end to a closed bottom portion at the second end, the closed bottom portion having a tab extending into the second aperture, the central portion of the tab being positioned out of alignment in respect of the centrally disposed longitudinal axis;
   wherein the closed bottom portion breaks near the tab and tears and rotates away from said central hub when a downward force provided by a negative current collector forced through the second aperture is applied thereto, the bottom portion remaining partially attached to said central hub.

4. An alkaline electrochemical cell, comprising:
   (a) a cylindrical metal container having an inner surface, a closed first end forming a bottom and an initially open second end, and upstanding sidewalls, the container forming a positive current collector;
   (b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;
   (c) a cylindrical anode having an outer peripheral surface and comprising gelled zinc, the anode being disposed within the central cylindrically shaped void;
   (d) an ionically permeable separator interposed between at least a portion of the outer peripheral surface of the anode and the inner peripheral surface of the cathode;
   (e) a centrally disposed negative current collector electrically connected to the anode, and:
   (f) a sealing cap comprising:
      (1) a base with a top surface, a bottom surface, an outer circumference, and a generally centrally disposed inner first aperture defined by an inner periphery of the base, the base being shaped and sized to cover a predetermined size and shape battery;
      (2) an annular rim attached to and extending upwardly from the top surface, the rim extending around the first outer circumference; and
      (3) a central hub having an upper first end, a lower second end, and an outer periphery disposed therebetween, the hub being disposed within the first aperture, the outer periphery being contiguous with and attached to the inner periphery, the hub further having a generally centrally located second aperture disposed therethrough, the second aperture having a centrally disposed longitudinal axis extending from the first end to a closed bottom portion at the second end, the closed bottom portion having a tab extending into the second aperture, the central portion of the tab, being positioned out of alignment in respect of the centrally disposed longitudinal axis;
   wherein the closed bottom portion breaks near the tab and tears and rotates downwardly when a downward force provided by a negative current collector forced through the second aperture is applied thereto, the bottom portion remaining partially attached to said central hub.

5. A battery sealing cap, for use in an electrochemical cell, said sealing cap comprising:
   (a) an annular rim, coupled to a central hub portion by a base portion;
   (b) said central hub portion having a channel;
   (c) said channel occluded by a closed bottom portion;
   (d) said closed bottom portion including a tab asymmetrically positioned in said channel.

6. The battery sealing cap of claim 5, further including a first end having a beveled opening for receiving and aligning a negative current collector, such that said current collector is aligned with the central axis of said channel.

7. The battery sealing cap of claim 6, wherein said negative current collector is further characterized by a flat end surface.

8. A sealing cap for an electrochemical cell, comprising:
   (a) a substantially disk-shaped base member forming an outer radial portion of the cap, the cap having an upper surface, a lower surface, an inner periphery, and an outer rim, the outer rim being formed to engage and seal against the positive current collector of the cell, the base member lying substantially in a plane;
   (b) a central hub forming an inner radial portion of the cap, the hub having a top, a bottom, and peripheral sidewalls disposed therebetween, the sidewalls being connected to and contiguous with at least one of the inner periphery, the upper surface, and the lower surface, the hub having a longitudinal channel disposed between the top and the bottom, the channel being oriented substantially perpendicular to the plane and being defined by inner sidewalls, a tab extending into and closing the channel near the bottom, the tab having an upper surface;

wherein as a negative current collector is forced downwardly through the channel, and as the bottom end thereof engages the top surface of the tab, the tab rotates away and detaches from a first portion of at least one of the inner sidewalls and the bottom in response to the downward force and rotational moment supplied by the negative current collector, at least a second portion of the tab remaining attached to at least one of the inner sidewalls and the bottom after the negative current collector has been inserted through the sealing disk.

9. The sealing cap of claim 8, wherein the cap fits a D-size cylindrical cell.

10. The sealing cap of claim 8, wherein the cap fits a C-size cylindrical cell.

11. The sealing cap of claim 8, wherein the cap fits an AA-size cylindrical cell.

12. The sealing cap of claim 8, wherein the cap fits a AAA-size cylindrical cell.

13. The sealing cap of claim 8, wherein the cap fits a cylindrical alkaline manganese dioxide cell.

14. The sealing cap of claim 8, wherein the cap is formed of a material selected from the group consisting of at least one of nylon, polypropylene, or polyamide plastic materials.

* * * * *